(12) United States Patent
Taguchi

(10) Patent No.: US 12,082,105 B2
(45) Date of Patent: Sep. 3, 2024

(54) INFORMATION PROCESSING APPARATUS, INFORMATION PROCESSING METHOD, AND NON-TRANSITORY COMPUTER READABLE MEDIUM FOR CONNECTING DEVICE THAT IS TO EXECUTE A PROCESS TO AN ACCESS POINT

(71) Applicant: FUJIFILM Business Innovation Corp., Tokyo (JP)

(72) Inventor: Maki Taguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 209 days.

(21) Appl. No.: 17/582,518

(22) Filed: Jan. 24, 2022

(65) Prior Publication Data

US 2023/0063379 A1    Mar. 2, 2023

(30) Foreign Application Priority Data

Sep. 2, 2021  (JP) ................................ 2021-143470

(51) Int. Cl.
| | |
|---|---|
| *H04W 48/20* | (2009.01) |
| *H04W 28/18* | (2009.01) |
| *H04W 36/08* | (2009.01) |
| *H04W 36/30* | (2009.01) |
| *H04W 64/00* | (2009.01) |
| *H04W 72/29* | (2023.01) |

(52) U.S. Cl.
CPC .......... *H04W 48/20* (2013.01); *H04W 28/18* (2013.01); *H04W 36/08* (2013.01); *H04W 64/003* (2013.01); *H04W 72/29* (2023.01); *H04W 36/30* (2013.01)

(58) Field of Classification Search
CPC ..... H04W 48/20; H04W 28/18; H04W 36/08; H04W 64/003; H04W 72/29; H04W 36/30
USPC ................... 370/320, 331; 455/414.1–414.2, 455/435.1–444, 456.1–457
See application file for complete search history.

(56) References Cited

U.S. PATENT DOCUMENTS

| | | | |
|---|---|---|---|
| 2011/0216692 A1* | 9/2011 | Lundsgaard | H04W 48/20 370/328 |
| 2017/0123739 A1* | 5/2017 | Konji | G06F 3/1236 |
| 2017/0215093 A1* | 7/2017 | Zhang | H04W 24/08 |
| 2020/0162986 A1* | 5/2020 | Pati | H04W 36/385 |

FOREIGN PATENT DOCUMENTS

| | | |
|---|---|---|
| JP | 2018-056778 A | 4/2018 |
| JP | 6624888 B2 | 12/2019 |
| JP | 2020-072470 A | 5/2020 |

* cited by examiner

*Primary Examiner* — Michael Y Mapa
(74) *Attorney, Agent, or Firm* — Oliff PLC

(57) ABSTRACT

An information processing apparatus includes a processor configured to: cause a memory to store information related to a first access point when connecting to a device that is to execute a process via the first access point and causing the device to execute the process; and execute a switching process for switching an access point serving as a connection destination to the first access point if a currently-connected access point is different from the first access point when requesting the device to execute the process.

9 Claims, 5 Drawing Sheets

FIG. 7

| NAME OF TERMINAL APPARATUS | NAME OF PRINTER | SSID | VOLUME OF DATA | RADIO FIELD STRENGTH | PRINTING RESULT |
|---|---|---|---|---|---|
| TERMINAL APPARATUS A | PRINTER A | 11111 | 10 KB | WEAK | SUCCESSFUL |
| TERMINAL APPARATUS A | PRINTER A | 11111 | 50 KB | WEAK | FAILED |
| TERMINAL APPARATUS A | PRINTER A | 11111 | 300 KB | MEDIUM | SUCCESSFUL |
| TERMINAL APPARATUS A | PRINTER A | 11111 | 500 KB | MEDIUM | FAILED |
| TERMINAL APPARATUS A | PRINTER A | 11111 | 3 MB | STRONG | SUCCESSFUL |
| TERMINAL APPARATUS A | PRINTER B | 22222 | 50 KB | WEAK | FAILED |
| TERMINAL APPARATUS A | PRINTER B | 22222 | 100 KB | MEDIUM | FAILED |
| TERMINAL APPARATUS A | PRINTER B | 22222 | 500 MB | MEDIUM | FAILED |
| TERMINAL APPARATUS A | PRINTER B | 22222 | 1 MB | STRONG | SUCCESSFUL |

INFORMATION PROCESSING APPARATUS, INFORMATION PROCESSING METHOD, AND NON-TRANSITORY COMPUTER READABLE MEDIUM FOR CONNECTING DEVICE THAT IS TO EXECUTE A PROCESS TO AN ACCESS POINT

CROSS-REFERENCE TO RELATED APPLICATIONS

This application is based on and claims priority under 35 USC 119 from Japanese Patent Application No. 2021-143470 filed Sep. 2, 2021.

BACKGROUND

(i) Technical Field

The present disclosure relates to information processing apparatuses, information processing methods, and non-transitory computer readable media.

(ii) Related Art

A request for executing a process is sometimes made to a device (e.g., a printer) that executes the process by connecting to the device via an access point.

Japanese Patent No. 6624888 describes an apparatus that determines whether communication with a communication device is possible in a network to which a terminal apparatus is currently connected based on identification information used for identifying the communication device and obtained at the time when the communication device is registered, determines whether the network to which the terminal apparatus is connected is to be changed to a predetermined network used by the communication device at the time when the communication device is registered, and changes the network to which the terminal apparatus is to be connected to the predetermined network based on these determination results.

Japanese Unexamined Patent Application Publication No. 2020-072470 describes an apparatus that stores wireless connection information when connected in a handover fashion. When the apparatus cuts off a wireless connection after transmitting job data and subsequently receives a transmission command for new job data, the apparatus performs a wireless connection by using the stored wireless connection information if a predetermined condition is satisfied.

Japanese Unexamined Patent Application Publication No. 2018-056778 describes an apparatus that transitions to a communication connected state with another device if the apparatus receives a predetermined wireless signal from the device, transitions to a communication disconnected state by disconnecting the communication if the apparatus determines that wireless communication is not possible in the communication connected state, records the history of the disconnection, and controls the transition to the communication connected state with the device based on the history of the disconnection.

SUMMARY

After a device that is to execute a process is connected via an access point, the access point serving as the connection destination may sometimes be automatically switched to another access point. In this case, it may be difficult for the device to execute the process.

Aspects of non-limiting embodiments of the present disclosure relate to causing a device that is to execute a process to execute the process even when an access point via which the device is connected is switched to another access point.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a processor configured to: cause a memory to store information related to a first access point when connecting to a device that is to execute a process via the first access point and causing the device to execute the process; and execute a switching process for switching an access point serving as a connection destination to the first access point if a currently-connected access point is different from the first access point when requesting the device to execute the process.

BRIEF DESCRIPTION OF THE DRAWINGS

Exemplary embodiments of the present disclosure will be described in detail based on the following figures, wherein:

FIG. 7 illustrates a history of printing.

DETAILED DESCRIPTION

Figure 1:
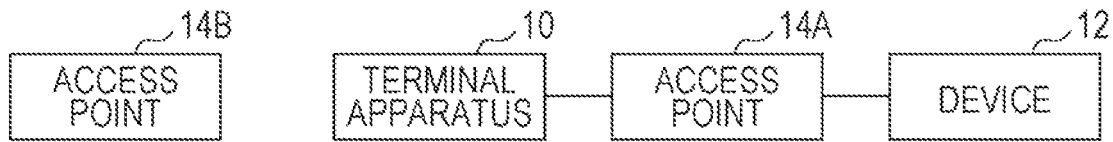
FIG. 1 is a block diagram illustrating the configuration of an information processing system.

An information processing system according to an exemplary embodiment will now be described with reference to FIG. 1. FIG. 1 illustrates an example of the configuration of the information processing system according to the exemplary embodiment.

The information processing system according to the exemplary embodiment includes, for example, one or more terminal apparatuses 10, one or more devices 12, and one or more access points (APs). In the example shown in FIG. 1, for example, access points 14A and 14B are included in the information processing system. Although FIG. 1 illustrates a single terminal apparatus 10, a single device 12, and two access points, the number thereof is merely an example, such that one or more terminal apparatuses 10, one or more devices 12, and one or more access points are included in the information processing system.

The terminal apparatus 10 may be, for example, a personal computer (referred to as "PC" hereinafter), a tablet PC, a smartphone, or a portable telephone. The terminal apparatus 10 corresponds to an example of an information processing apparatus.

The device 12 may be, for example, a printer, a scanner, a photocopier, a facsimile device, a multifunction device (e.g., a device having a printing function, a scanning function, and a copying function), a PC, a display, a household appliance (e.g., an air conditioner, an illuminator, or a refrigerator), a storage device, or another type of device. These are merely examples of the device 12, and a device other than those mentioned above may be included as the device 12 in the information processing system. For example, the device 12 may be any type of device so long as the device receives a request for executing a process from an apparatus other than the device 12 via an access point and executes the process in accordance with the request.

The access points 14A and 14B are devices (e.g., wireless devices) that connect apparatuses and devices, such as the terminal apparatus 10 and the device 12, to each other by wireless communication. Each of the access points 14A and 14B may connect an apparatus or device to a communication path, such as a local area network (LAN) or the Internet, by using wireless communication, or may connect a wired LAN and a wireless LAN. A device functioning both as a router, such as a wireless LAN router, and an access point may be used as the access point 14A or 14B. Furthermore, a device operating as a client in wireless communication and functioning as an access point in software level may be used as the access point 14A or 14B. Although one example of wireless communication is Wi-Fi (registered trademark), a wireless communication technology other than Wi-Fi may be used. The standard used for wireless communication (e.g., the communication bandwidth) is not particularly limited and may be any type of standard.

For example, the terminal apparatus 10 connects to the device 12 by wireless communication via an access point and transmits information indicating a request for executing a process to the device 12. The device 12 receives the information indicating the request for executing the process from the terminal apparatus 10 via the access point and executes the process in accordance with the request. In this manner, the device 12 receives information indicating a request for executing a process from the terminal apparatus 10 via an access point and executes the process.

Figure 2:
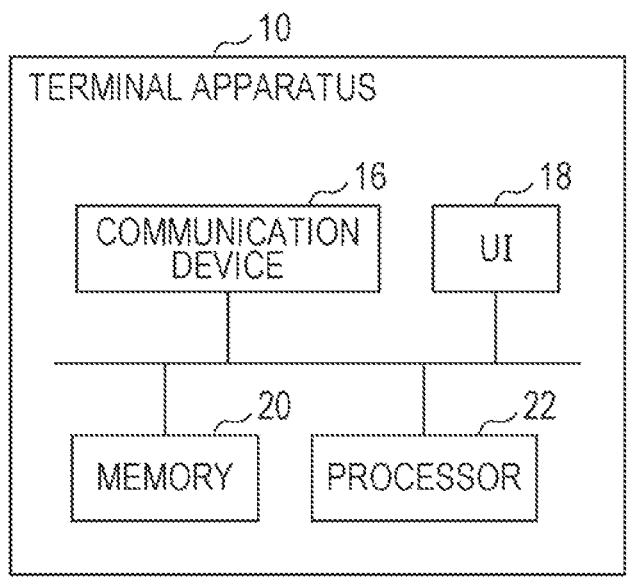
FIG. 2 is a block diagram illustrating a hardware configuration of a terminal apparatus.

A hardware configuration of the terminal apparatus 10 will be described below with reference to FIG. 2. FIG. 2 illustrates an example of the hardware configuration of the terminal apparatus 10.

The terminal apparatus 10 includes, for example, a communication device 16, a user interface (UI) 18, a memory 20, and a processor 22.

The communication device 16 is a communication interface having, for example, a communication chip and a communication circuit, and has a function for transmitting information to another device and a function for receiving information transmitted from another device. The communication device 16 has a wireless communication function and connects to an access point by wireless communication so as to communicate with another device via the access point. The communication device 16 may also have a wired communication function.

The UI 18 is a user interface and includes a display and an operation device. The display is, for example, a liquid crystal display or an electroluminescent (EL) display. The operation device is, for example, a keyboard, a mouse, an input button, or an operation panel. The UI 18 may be a UI, such as a touchscreen, functioning both as a display and an operation device. The UI 18 may include a microphone and a loudspeaker.

The memory 20 has one or more storage areas for storing data. Examples of the memory 20 include a hard disk drive (HDD), a solid state drive (SSD), various types of memory (e.g., a RAM, a DRAM, and a ROM), other types of storage devices (e.g., an optical disk), or a combination thereof. One or more units of memory 20 are included in the terminal apparatus 10.

The processor 22 is configured to control the operation of each component of the terminal apparatus 10. The processor 22 may have a memory.

In a case where the processor 22 connects to the device 12 via an access point and causes the device 12 to execute a process, the processor 22 causes the memory 20 of the terminal apparatus 10 to store information related to the access point. Subsequently, when the terminal apparatus 10 requests the device 12 to execute another process, if the access point to which the terminal apparatus 10 is currently connected is different from the access point stored in the memory 20 of the terminal apparatus 10, the processor 22 of the terminal apparatus 10 executes a process for switching the access point serving as the connection destination of the terminal apparatus 10 to the access point stored in the memory 20 of the terminal apparatus 10.

Each access point (AP) has AP identification information allocated thereto for identifying the access point. For example, AP identification information is stored in each access point. Information related to an access point contains AP identification information for identifying the access point. Examples of the AP identification information include a service set identifier (SSID), a basic service set identifier (BSSID), and an extended service set identifier (ESSID) in Wi-Fi. If a password for using an access point is set for the access point, the information related to the access point may contain the password.

The access-point switching process involves switching the access point serving as the connection destination to the access point stored in the memory 20 even if an access-point switching command is not received from a user, or prompting the user to switch the access point serving as the connection destination to the access point stored in the memory 20. In other words, the processor 22 of the terminal apparatus 10 may automatically switch access points even without receiving an access-point switching command from the user, or may switch access points when receiving an access-point switching command from the user.

Figure 3:
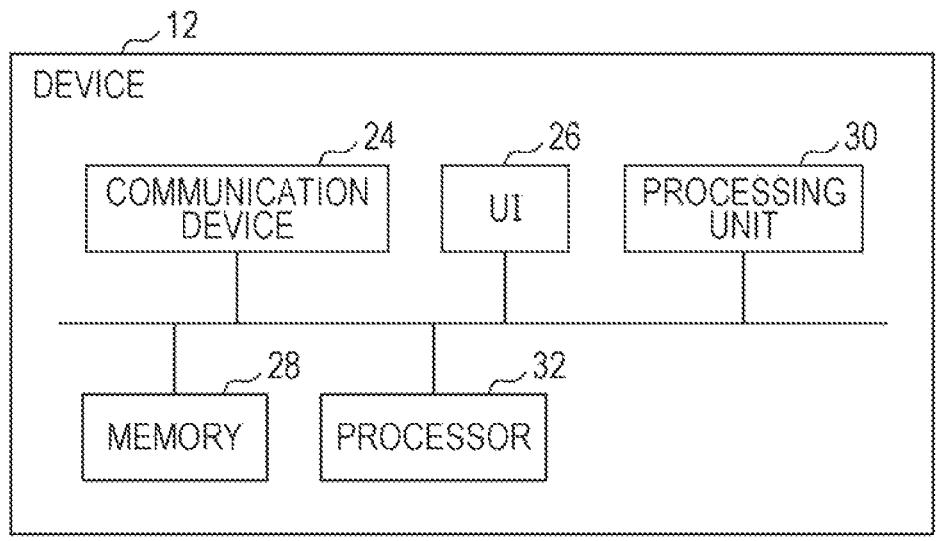
FIG. 3 is a block diagram illustrating a hardware configuration of a device.

A hardware configuration of the device 12 will be described below with reference to FIG. 3. FIG. 3 illustrates an example of the hardware configuration of the device 12.

The device 12 includes, for example, a communication device 24, a UI 26, a memory 28, a processing unit 30, and a processor 32.

The communication device 24 is a communication interface having, for example, a communication chip and a communication circuit, and has a function for transmitting information to another device and a function for receiving information transmitted from another device. The communication device 24 has a wireless communication function and connects to an access point by wireless communication so as to communicate with another device via the access point. The communication device 24 may also have a wired communication function.

The UI 26 is a user interface and includes a display and an operation device. The display is, for example, a liquid crystal display or an EL display. The operation device is, for example, a keyboard, a mouse, an input button, or an operation panel. The UI 26 may be a UI, such as a touchscreen, functioning both as a display and an operation device. The UI 26 may include a microphone and a loudspeaker.

The memory 28 has one or more storage areas for storing data. Examples of the memory 28 include a hard disk drive (HDD), a solid state drive (SSD), various types of memory (e.g., a RAM, a DRAM, and a ROM), other types of storage devices (e.g., an optical disk), or a combination thereof. One or more units of memory 28 are included in the device 12.

In the memory 28, device identification information for identifying the device 12 (e.g., information indicating the name of the device 12 and a MAC address thereof) and connection information used for connecting to the device 12 (e.g., an IP address of the device 12) are preliminarily stored.

The processing unit 30 executes a process realized by a function that the device 12 has.

For example, in a case where the device 12 is a printer, the processing unit 30 forms an image or document to be printed onto a recording medium, such as a sheet. Accordingly, the image or document to be printed is printed onto the recording medium. Printing may be performed using any method. For example, the inkjet method, the electrophotographic method, the thermal method, or the thermal transfer method may be used. For example, print data containing an image or document to be printed and printing conditions is transmitted from the terminal apparatus 10 to the device 12 via an access point. The processing unit 30 receives the print data and prints the image or document onto a recording medium.

The device 12 may also include a scanner. In this case, the processing unit 30 may execute scanning to generate an image, or may perform copying. The image generated as a result of scanning may be transmitted from the device 12 to the terminal apparatus 10 via an access point. The device 12 may also include a facsimile device.

Although the above description relates to an example where the device 12 is a printer or a multifunction device, the device 12 may be a device other than a printer or a multifunction device. For example, in a case where the device 12 is an air conditioner, the processing unit 30 controls an air-conditioning operation, such as a cooling operation or a heating operation, in accordance with a request transmitted from the terminal apparatus 10 via an access point. For example, the temperature and the wind direction are controlled.

The processor 32 is configured to control the operation of each component of the device 12. The processor 32 may have a memory.

The exemplary embodiment will be described below in further detail.

In the following description, it is assumed that, for example, the device 12 is a printer and is connected to the access point 14A. For example, the device 12 is connected to the same LAN of the access point 14A. By connecting to the access point 14A, the terminal apparatus 10 is capable of connecting to the device 12 via the access point 14A and requesting the device 12 serving as a printer to execute printing.

The device 12 is not connected to the access point 14B. Therefore, even by connecting the access point 14B, the terminal apparatus 10 is not capable of connecting to the device 12 via the access point 14B.

The access point 14A may be included in the device 12. In other words, the device 12 may have the access point 14A incorporated therein.

Figure 4:
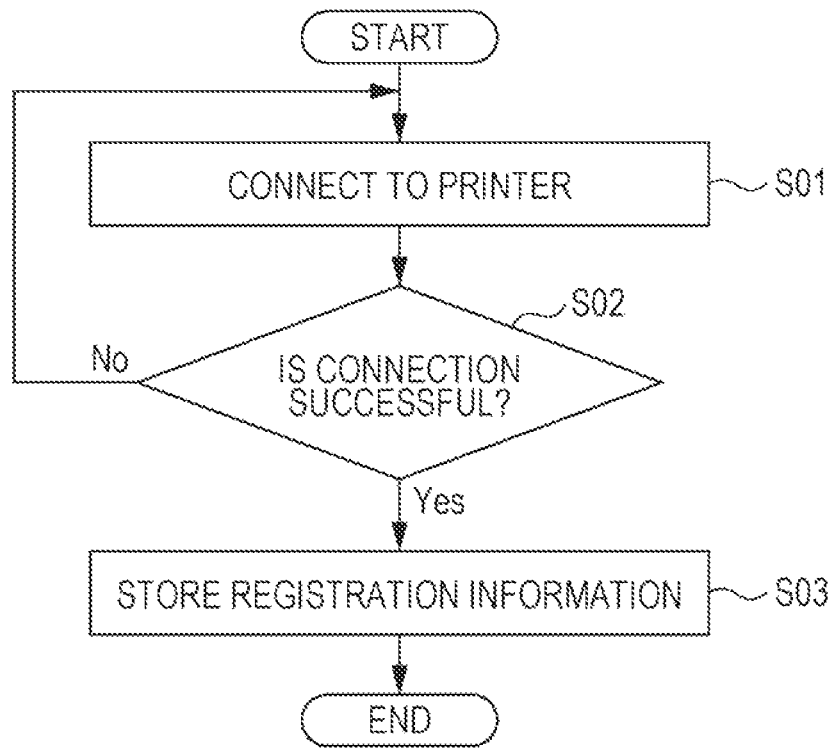
FIG. 4 is a flowchart illustrating the flow of a registration process of the device.

The flow of a process for registering the device 12 in the terminal apparatus 10 will now be described with reference to FIG. 4. FIG. 4 is a flowchart illustrating the flow.

First, in step S01, the terminal apparatus 10 connects to the device 12 serving as a printer.

For example, it is conceivable that the AP identification information, such as the SSID, of the access point 14A is already stored in the memory 20 of the terminal apparatus 10, the access point 14A is set as an access point serving as a connection destination in the terminal apparatus 10, and the terminal apparatus 10 is already connected to the access point 14A. In this case, when the user uses the terminal apparatus 10 to designate the device 12 and make a request for connecting to the device 12, the processor 22 of the terminal apparatus 10 connects to the device 12 via the access point 14A.

In a case where the terminal apparatus 10 is already connected to the access point 14A, if the user uses the terminal apparatus 10 to give a command for displaying a list of devices 12 connected to the access point 14A, the processor 22 of the terminal apparatus 10 may cause the display of the terminal apparatus 10 to display the list of devices 12 connected to the access point 14A. When the user selects a device 12 as a connection destination from the list, the processor 22 of the terminal apparatus 10 connects to the device 12 selected by the user via the access point 14A.

As another example, the user may input the AP identification information, such as the SSID, of the access point 14A to the terminal apparatus 10 to give a command for connecting to the access point 14A, and the processor 22 of the terminal apparatus 10 may connect to the access point 14A in accordance with the command. Subsequently, when the user selects a device 12 as a connection destination, the processor 22 of the terminal apparatus 10 connects to the selected device 12 via the access point 14A.

When the connection between the terminal apparatus 10 and the device 12 is successful (Yes in step S02), the processor 22 of the terminal apparatus 10 causes the memory 20 of the terminal apparatus 10 to store registration information containing information about the access point 14 serving as the connection destination in step S03. It is confirmable whether or not the connection is successful by using a known technique, such as using a ping command. If the connection is not successful (No in step S02), the process returns to step S01.

The registration information contains, for example, device identification information about the device 12 serving as the connection destination (e.g., information indicating the name of the device 12), connection information about the device 12 (e.g., the IP address of the device 12), and AP identification information (e.g., the SSID) of the access point 14A serving as the connection destination.

The registration information may also contain positional information indicating the position of the terminal apparatus 10 at the time when the connection with the device 12 is successful, distance information indicating the distance between the terminal apparatus 10 and the access point 14 at the time when the connection with the device 12 is successful, and distance information indicating the distance between the terminal apparatus 10 and the device 12 at the time when the connection with the device 12 is successful. The position and the distance are measured by using, for example, Bluetooth Low Energy (BLE), Ultra-Wide Band (UWB), or Global Positioning System (GPS). In a case where the access point 14A is provided in the device 12, the distance between the terminal apparatus 10 and the device 12 and the distance between the terminal apparatus 10 and the access point 14A are the same.

The registration information may also contain an image generated as a result of being captured by a camera at the time when the connection with the device 12 is successful. For example, if the terminal apparatus 10 is equipped with a camera, an image generated as a result of being captured by the camera in the terminal apparatus 10 is contained in the registration information. Furthermore, an image generated as a result of being captured by a camera set around the terminal apparatus 10 (e.g., a camera set indoors or in a store) may be contained in the registration information.

Moreover, the registration information may contain map information indicating a location (e.g., an indoor location) where the connection with the device 12 is successful or a three-dimensional (3D) map expressing the location (e.g., an indoor location). The 3D map is created by using, for example, LiDAR (light detection and ranging).

Furthermore, when the connection with the device 12 is successful, if the user uses the terminal apparatus 10 to make a request for executing printing, the processor 22 of the terminal apparatus 10 transmits print data containing an image or document to be printed and printing conditions to the device 12 via the access point 14A. When the device 12 receives the print data via the access point 14A, the device 12 prints the image or document onto a recording medium, such as a sheet, in accordance with the printing conditions. In the case where printing is executed by the device 12 in this manner, the processor 22 of the terminal apparatus 10 may incorporate information indicating the volume of data of the printed image or document and information indicating the radio field strength of the access point 14A at the time of the printing in association with each other in the registration information.

The one or more devices 12 are registered in the terminal apparatus 10. For example, in a case where the terminal apparatus 10 successfully connects to multiple devices 12 via the same access point 14A, the registration information about each of the multiple devices 12 is stored in the memory 20 of the terminal apparatus 10.

It is conceivable that a device 12 (referred to as "device 12A" hereinafter) is connected to the access point 14A, and another device 12 (referred to as "device 12B" hereinafter) is connected to the access point 14B. In this case, when the terminal apparatus 10 successfully connects to the device 12A via the access point 14A and successfully connects to the device 12B via the access point 14B, registration information about the device 12A and registration information about the device 12B are stored in the memory 20 of the terminal apparatus 10.

An access point registered in the terminal apparatus 10 corresponds to an example of a first access point. For example, in a case where the terminal apparatus 10 successfully connects to the device 12A via the access point 14A and registration information containing the AP identification information of the access point 14A is stored in the memory 20 of the terminal apparatus 10, the access point 14A corresponds to an example of the first access point.

The following description relates to the flow of a process when printing is performed by using a device 12 registered in the terminal apparatus 10.

First Exemplary Embodiment

Figure 5:
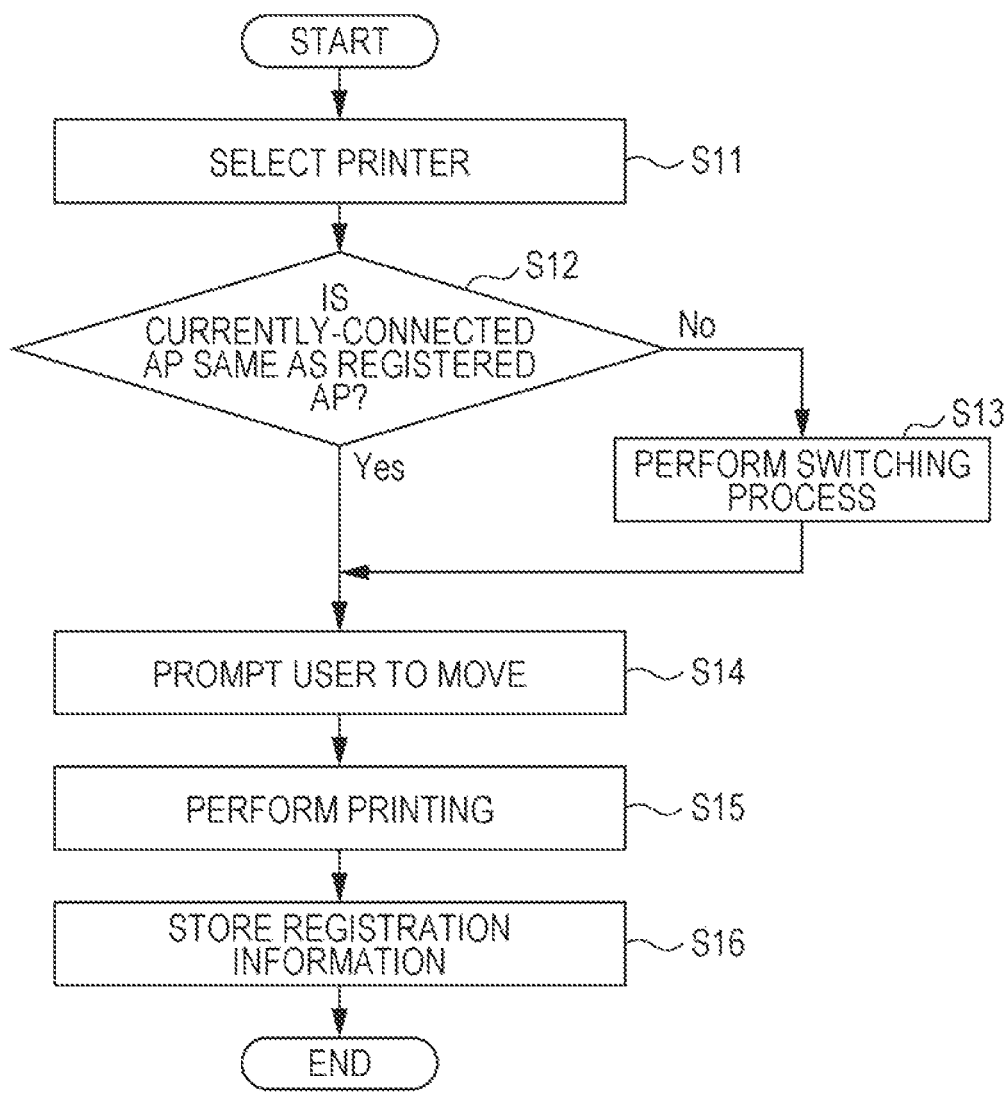
FIG. 5 is a flowchart illustrating the flow of a process according to a first exemplary embodiment.

The flow of a process according to a first exemplary embodiment will now be described with reference to FIG. 5. FIG. 5 is a flowchart illustrating the flow of the process according to the first exemplary embodiment.

First, in step S11, the user uses the terminal apparatus 10 to select a printer (i.e., a device 12) that is to execute printing. For example, printing application software for executing printing is installed in the terminal apparatus 10. When printing is to be executed, the user activates the printing application software in the terminal apparatus 10. When the user uses the terminal apparatus 10 to command the printing application software to display a list of devices 12 registered in the terminal apparatus 10, the processor 22 of the terminal apparatus 10 causes the display of the terminal apparatus 10 to display a list of devices 12 indicated by the registration information stored in the memory 20. For example, the device identification information contained in the registration information is displayed. The user selects a device 12 that is to execute printing from the list.

Then, in step S12, the processor 22 of the terminal apparatus 10 determines whether or not the access point (AP) to which the terminal apparatus 10 is currently connected is the same as the access point (AP) indicated by the AP identification information contained in the registration information about the device 12 selected in step S11. In other words, the processor 22 determines whether or not the access point to which the terminal apparatus 10 is currently connected is the same as the access point (AP) registered in the terminal apparatus 10.

If the access point (AP) to which the terminal apparatus 10 is currently connected is not the access point (AP) registered in the terminal apparatus 10 (No in step S12), the processor 22 of the terminal apparatus 10 executes step S13 for switching the access point serving as the connection destination to the registered access point. Subsequently, the process proceeds to step S14. In other words, if the access point to which the terminal apparatus 10 is currently connected is not the same as the access point indicated by the AP identification information contained in the registration information about the device 12 selected by the user in step S11 (No in step S12), the processor 22 of the terminal apparatus 10 executes a process for switching the connected access point to the access point indicated by the AP identification information contained in the registration information about the device 12 selected by the user in step S11.

If the access point (AP) to which the terminal apparatus 10 is currently connected is the same as the access point (AP) registered in the terminal apparatus 10 (Yes in step S12), the process proceeds to step S14. In other words, if the access point to which the terminal apparatus 10 is currently connected is the same as the access point indicated by the AP identification information contained in the registration information about the device 12 selected by the user in step S11 (Yes in step S12), the process proceeds to step S14.

For example, it is assumed that the registration information about the device 12A connected to the access point 14A is stored in the memory 20 of the terminal apparatus 10, the device 12A and the access point 14A are registered in the terminal apparatus 10, and the device 12A is selected by the user in step S11. In this case, if the access point to which the terminal apparatus 10 is currently connected is not the access point 14A (e.g., if the access point to which the terminal apparatus 10 is currently connected is the access point 14B) (No in step S12), the processor 22 of the terminal apparatus 10 executes step S13 for switching the access point serving as the connection destination from the access point 14B to the access point 14A. If the access point to which the terminal apparatus 10 is currently connected is the access point 14A (Yes in step S12), the processor 22 of the terminal apparatus 10 does not switch the access point serving as the connection destination. In this case, the process proceeds to step S14. The access point 14A in this case corresponds to an example of a first access point.

Step S13 will be described in detail.

For example, if the terminal apparatus 10 has a function for automatically switching the access point serving as the connection destination even without receiving an access-point switching command from the user, the processor 22 of the terminal apparatus 10 automatically switches the connected access point to the access point indicated by the AP identification information contained in the registration information about the device 12 selected by the user in step S11. In a case where the device 12A is selected by the user in step S11 and the access point to which the terminal apparatus 10 is currently connected is the access point 14B, the processor 22 of the terminal apparatus 10 automatically switches the access point serving as the connection destination from the access point 14B to the access point 14A. Accordingly, the processor 22 of the terminal apparatus 10 connects to the access point 14A without connecting to the access point 14B. Subsequently, step S14 and onward are executed.

If the terminal apparatus 10 does not have a function for automatically switching the access point serving as the connection destination even without receiving an access-point switching command from the user, the processor 22 of the terminal apparatus 10 prompts the user to switch the access point serving as the connection destination to the access point indicated by the AP identification information contained in the registration information about the device 12 selected by the user in step S11. In a case where the device 12A is selected by the user in step S11 and the access point to which the terminal apparatus 10 is currently connected is the access point 14B, the processor 22 of the terminal apparatus 10 causes the display of the terminal apparatus 10 to display information prompting the user to switch the access point serving as the connection destination from the access point 14B to the access point 14A (e.g., a message prompting the user to switch access points). It is conceivable that the user may refer to the information and operate the terminal apparatus 10 to switch the access point serving as the connection destination from the access point 14B to the access point 14A. If the access point is switched from the access point 14B to the access point 14A by the user, the processor 22 of the terminal apparatus 10 connects to the access point 14A without connecting to the access point 14B. When the processor 22 of the terminal apparatus 10 connects to the access point 14A, step S14 and onward are executed. The information prompting the user to switch access points may be output as audio from the loudspeaker included in the terminal apparatus 10.

Step S14 and onward will be described below.

In step S14, the processor 22 of the terminal apparatus 10 prompts the user to move to a location where the reception strength of a radio wave from the access point serving as the connection destination (e.g., the access point 14A) is higher.

As mentioned above, the registration information containing the AP identification information of the access point 14A contains positional information indicating the position of the terminal apparatus 10 at the time when the connection with the device 12A via the access point 14A is successful, distance information indicating the distance between the terminal apparatus 10 and the access point 14A at that time, and distance information indicating the distance between the terminal apparatus 10 and the device 12 at that time. In other words, the positional information and the distance information at the time when the device 12A and the access point 14A are registered in the terminal apparatus 10 are contained in the registration information and are stored in the memory 20 of the terminal apparatus 10. The position of the terminal apparatus 10 at the time when the connection with the device 12A via the access point 14A is successful and when the device 12A and the access point 14A are registered in the terminal apparatus 10 in the past is estimated to be a location where the reception strength of the radio wave from the access point 14A is high. The processor 22 of the terminal apparatus 10 prompts the user to move to the position of the terminal apparatus 10 at the time when the device 12A and the access point 14A are registered in the terminal apparatus 10.

For example, if a difference between the current position of the terminal apparatus 10 and the position of the terminal apparatus 10 at the time when the device 12A and the access point 14A are registered in the terminal apparatus 10 is larger than or equal to a predetermined threshold value, the processor 22 of the terminal apparatus 10 prompts the user to move to the position of the terminal apparatus 10 at the time when the device 12A and the access point 14A are registered in the terminal apparatus 10.

In detail, the processor 22 of the terminal apparatus 10 calculates the aforementioned difference, and if the difference is larger than or equal to the threshold value, the processor 22 causes the display of the terminal apparatus 10 to display information indicating the moving direction and distance for the user. The moving direction for the user corresponds to the direction toward the position of the terminal apparatus 10 at the time when the device 12A and the access point 14A are registered in the terminal apparatus 10 with reference to the current position of the terminal apparatus 10.

For example, the processor 22 of the terminal apparatus 10 causes the display of the terminal apparatus 10 to display the information indicating the moving direction and distance for the user until the user reaches the position of the terminal apparatus 10 at the time when the device 12A and the access point 14A are registered in the terminal apparatus 10.

In a case where the registration information about the device 12A contains an image, the processor 22 of the terminal apparatus 10 may cause the display of the terminal apparatus 10 to display the image contained in the registration information about the device 12A and prompt the user to move to the position of the terminal apparatus 10 at the time when the device 12A and the access point 14A are registered in the terminal apparatus 10. If the current position of the terminal apparatus 10 and the position of the terminal apparatus 10 at the time when the device 12A and the access point 14A are registered in the terminal apparatus 10 are not much far apart, it is conceivable that the user may refer to the image and move to the position of the terminal apparatus 10 at the time when the device 12A and the access point 14A are registered in the terminal apparatus 10. For example, if the terminal apparatus 10 is currently connected to the access point 14A, it is conceivable that the current position of the terminal apparatus 10 and the position of the terminal apparatus 10 at the time when the device 12A and the access point 14A are registered in the terminal apparatus 10 are not much far apart. In such a case, it is conceivable that the user may refer to the image and move to the position of the terminal apparatus 10 at the time when the device 12A and the access point 14A are registered in the terminal apparatus 10.

If the registration information about the device 12A contains map information indicating a location where the connection with the device 12A is successful, the processor 22 of the terminal apparatus 10 may cause the display of the terminal apparatus 10 to display the map information. In this case, the processor 22 of the terminal apparatus 10 may indicate the current position of the terminal apparatus 10 and the position of the terminal apparatus 10 at the time when the device 12A and the access point 14A are registered in the terminal apparatus 10 on the map, and prompt the user to move to the position of the terminal apparatus 10 at the time when the device 12A and the access point 14A are registered in the terminal apparatus 10.

If the printing application software is terminated or if a predetermined time period elapses from when the printing by the device 12A is completed, the processor 22 of the terminal apparatus 10 may stop prompting the user to move to the position of the terminal apparatus 10 at the time when the device 12A and the access point 14A are registered in the terminal apparatus 10. For example, the processor 22 of the terminal apparatus 10 does not cause the display of the terminal apparatus 10 to display the information indicating the moving direction and distance for the user.

The processor 22 of the terminal apparatus 10 may prompt the user to move or not prompt the user to move depending on the reception strength of the radio wave from the access point 14A in the terminal apparatus 10. For example, the processor 22 of the terminal apparatus 10 may prompt the user to move if the reception strength of the radio wave from the access point 14A in the terminal apparatus 10 is below a threshold value, and not prompt the user to move if the reception strength is higher than or equal to the threshold value.

If the reception strength of the radio wave from the access point 14A at the current location of the user is lower than the reception strength of the radio wave at the time when the device 12A and the access point 14A are registered in the terminal apparatus 10, the processor 22 of the terminal apparatus 10 may prompt the user to move. Otherwise, the processor 22 may be configured not to prompt the user to move. The reception strength at the time of registration is contained in history information to be described later with reference to FIG. 7.

The information prompting the user to move may be output as audio from the loudspeaker included in the terminal apparatus 10.

Step S14 may be omitted.

When the access point serving as the connection destination is switched to the access point 14A and the user uses the terminal apparatus 10 to make a request for printing, the processor 22 of the terminal apparatus 10 transmits print data containing an image or document to be printed and printing conditions to the device 12A via the access point 14A. When the device 12A receives the print data via the access point 14A, the device 12A prints the image or document onto a recording medium, such as a sheet, in accordance with the printing conditions in step S15.

Subsequently, in step S16, the processor 22 of the terminal apparatus 10 causes the memory 20 of the terminal apparatus 10 to store the registration information about the device 12A. The registration information contains device identification information about the device 12A, connection information about the device 12A, and AP identification information about the access point 14A. The registration information may also contain positional information indicating the position of the terminal apparatus 10 at the time when the printing is performed by the device 12A, distance information indicating the distance between the terminal apparatus 10 and the access point 14A at the time when the printing is performed by the device 12A, and distance information indicating the distance between the terminal apparatus 10 and the device 12A at the time when the printing is performed by the device 12A. Moreover, the registration information may also contain an image generated as a result of being captured by the camera at the time when the printing is performed by the device 12A. Furthermore, the registration information may also contain information indicating the volume of data of the printed image or document and information indicating the radio field strength of the access point 14A at the time when the printing is performed.

With regard to the registration information about the device 12A already stored in the memory 20 of the terminal apparatus 10, each piece of information, such as the positional information, is added in step S16 to the registration information already stored in the memory 20. Each piece of information, such as the positional information, contained in the registration information may be replaced with new information in step S16.

As mentioned above, if the access point to which the terminal apparatus 10 is currently connected is different from the access point to which the device 12 (e.g., a printer) to be used by the user is connected, the access point serving as the connection destination is switched to the access point to which the device 12 is connected. For example, because the access point serving as the connection destination is switched to the access point to which the device 12 is connected, the terminal apparatus 10 becomes capable of connecting to the device 12 and requesting the device 12 to execute a process.

For example, the terminal apparatus 10 may sometimes have a function for automatically switching the access point serving as the connection destination to an access point where the reception strength of the radio wave is the highest, and the function may be set to an on mode. In this case, in the terminal apparatus 10, if the reception strength of the radio wave from the access point 14B to which the device 12A is not connected is higher than the reception strength of the radio wave from the access point 14A, the access point serving as the connection destination of the terminal apparatus 10 automatically switches to the access point 14B. As a result, the terminal apparatus 10 becomes incapable of connecting to the device 12A via the access point 14A and requesting the device 12A to execute a process. In contrast, in this exemplary embodiment, even when the aforementioned function is set in the on mode, the access point serving as the connection destination of the terminal apparatus 10 is switched to the access point 14A to which the device 12A is connected. Accordingly, in the terminal apparatus 10, even if the reception strength of the radio wave from the access point 14B is higher than the reception strength of the radio wave from the access point 14A, the terminal apparatus 10 may connect to the access point 14A and request the device 12A to execute a process by connecting to the device 12A via the access point 14A.

In other words, in a case where the function for automatically switching the access point 14 serving as the connection destination of the terminal apparatus 10 in accordance with the reception strength of the radio wave from the access point 14 in the terminal apparatus 10 is set in the on mode, even if the terminal apparatus 10 is connectable to another access point 14 (e.g., the access point 14B) where the reception strength of the radio wave is higher than at the access point 14A, the processor 22 of the terminal apparatus 10 connects to the access point 14A without connecting to the other access point 14. Furthermore, in a case where the terminal apparatus 10 is connected to the other access point 14, the processor 22 of the terminal apparatus 10 switches the access point 14 serving as the connection destination of the terminal apparatus 10 from the other access point 14 to the access point 14A.

Second Exemplary Embodiment

A process according to a second exemplary embodiment will be described below. The second exemplary embodiment is similar to the first exemplary embodiment in that printing is executed by using a device 12 serving as a printer. As mentioned above, in a case where printing is to be executed by using a device 12, the processor 22 of the terminal apparatus 10 transmits print data to the device 12 and requests the device 12 to execute printing. In the second exemplary embodiment, in accordance with the relationship between the volume of the print data and the reception strength of the radio wave from the access point 14 to which the device 12 is connected, the processor 22 of the terminal apparatus 10 prompts or does not prompt the user to move to a location where the reception strength of the radio wave from the access point is higher.

Figure 6:
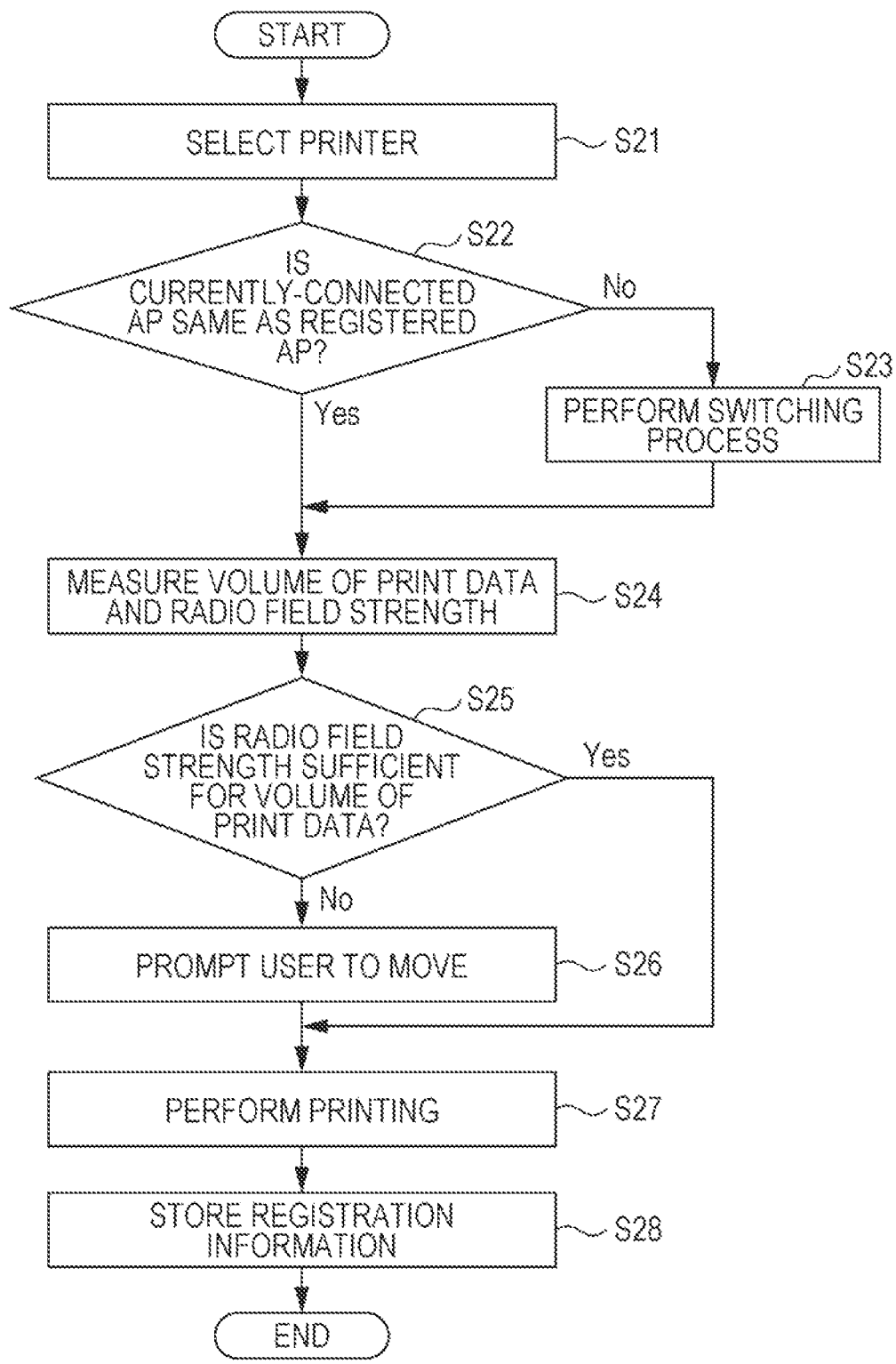
FIG. 6 is a flowchart illustrating the flow of a process according to a second exemplary embodiment.

The flow of the process according to the second exemplary embodiment will be described below with reference to FIG. 6. FIG. 6 is a flowchart illustrating the flow of the process according to the second exemplary embodiment.

First, similar to step S11 described above, the user uses the terminal apparatus 10 to select a printer (i.e., a device 12) that is to execute printing in step S21. Since the content of step S21 is identical to the content of step S11, a detailed description will be omitted.

Subsequently, similar to step S12 described above, the processor 22 of the terminal apparatus 10 determines in step S22 whether or not the access point (AP) to which the terminal apparatus 10 is currently connected is the same as the access point (AP) indicated by the AP identification information contained in the registration information about the device 12 selected in step S21. In other words, the processor 22 determines whether or not the access point to which the terminal apparatus 10 is currently connected is the same as the access point (AP) registered in the terminal apparatus 10.

Similar to step S12 and step S13 described above, if the access point (AP) to which the terminal apparatus 10 is currently connected is not the access point (AP) registered in the terminal apparatus 10 (No in step S22), the processor 22 of the terminal apparatus 10 executes step S23 for switching the access point serving as the connection destination to the registered access point. Subsequently, the process proceeds to step S24.

Similar to step S12 and step S13 described above, if the access point (AP) to which the terminal apparatus 10 is currently connected is the same as the access point (AP) registered in the terminal apparatus 10 (Yes in step S12), the process proceeds to step S24.

For example, it is assumed that the registration information about the device 12A connected to the access point 14A is stored in the memory 20 of the terminal apparatus 10, the device 12A and the access point 14A are registered in the terminal apparatus 10, and the device 12A is selected by the user in step S21. In this case, if the access point to which the terminal apparatus 10 is currently connected is not the access point 14A (e.g., if the access point to which the terminal apparatus 10 is currently connected is the access point 14B) (No in step S22), the processor 22 of the terminal apparatus 10 executes step S23 for switching the access point serving as the connection destination from the access point 14B to the access point 14A. If the access point to which the terminal apparatus 10 is currently connected is the access point 14A (Yes in step S22), the processor 22 of the terminal apparatus 10 does not switch the access point serving as the connection destination. In this case, the process proceeds to step S24.

In step S23, a process identical to that in step S13 described above is executed. In other words, the access point serving as the connection destination of the terminal apparatus 10 is automatically switched to the access point 14A to which the device 12A selected by the user is connected, or is switched to the access point 14A by an operation performed by the user. When the access point serving as the connection destination of the terminal apparatus 10 is switched to the access point 14A, step S24 and onward are executed.

Step S24 and onward will be described below.

In step S24, the processor 22 of the terminal apparatus 10 measures the volume of print data containing an image or document to be printed and the reception strength of the radio wave from the access point 14A in the terminal apparatus 10. The image or document to be printed is designated by the user.

Then, in step S25, the processor 22 of the terminal apparatus 10 determines whether or not the reception strength of the radio wave from the access point 14A is sufficient for the volume of print data. In other words, the processor 22 of the terminal apparatus 10 determines whether or not printing of the image or document to be printed contained in the print data may be properly completed based on the volume of print data and the reception strength of the radio wave from the access point 14A. For example, if the volume of print data, more specifically, the volume of image or document to be printed, is small, the image or document data may be properly be transmitted to the device 12A so that printing may possibly be completed even if the radio field strength is not high. In that case, the processor 22 of the terminal apparatus 10 determines that the reception strength of the radio wave from the access point 14A is sufficient for the volume of print data.

In detail, the processor 22 of the terminal apparatus 10 determines whether or not the reception strength of the radio wave from the access point 14 is sufficient for the volume of print data based on the correspondence relationship among the volume of print data, the radio field strength, and the printing result. For example, the volume of print data used for printing in the past, the reception strength of the radio wave from the access point 14 to which the terminal apparatus 10 is connected at the time of the printing, and information indicating whether or not the printing is successful are associated with one another and are managed as a history of printing executed in the past. The information indicating the history may be stored in the memory 20 of the terminal apparatus 10, may be stored in the memory 28 of each device 12, or may be stored in an apparatus (e.g., a server) different from the above. The processor 22 of the terminal apparatus 10 refers to the information indicating the history to determine whether or not the reception strength of the radio wave from the access point serving as the connection destination (e.g., the access point 14A) of the terminal apparatus 10 is sufficient for the volume of print data. For example, in the history, if the information indicating that the printing is successful is associated with the combination of the volume of print data used for the printing and the reception strength of the radio wave from the access point serving as the connection destination (e.g., the access point 14A) of the terminal apparatus 10, the processor 22 of the terminal apparatus 10 determines that the reception strength of the radio wave from the access point serving as the connection destination (e.g., the access point 14A) of the terminal apparatus 10 is sufficient for the volume of print data. In contrast, in the history, if the information indicating that the printing has failed is associated with the combination of the volume of print data used for the printing and the reception strength of the radio wave from the access point serving as the connection destination (e.g., the access point 14A) of the terminal apparatus 10, the processor 22 of the terminal apparatus 10 determines that the reception strength of the radio wave from the access point serving as the connection destination (e.g., the access point 14A) of the terminal apparatus 10 is not sufficient for the volume of print data.

Furthermore, a threshold value for the volume of print data may be set for the reception strength of the radio wave from each access point 14, and the processor 22 of the terminal apparatus 10 may use the threshold value corresponding to the reception strength of the radio wave from the access point 14A in the terminal apparatus 10 to determine whether or not the reception strength of the radio wave from the access point 14A is sufficient for the volume of print data. A process using a threshold value will be described in detail later with reference to FIG. 7.

If the reception strength of the radio wave from the access point 14A serving as the connection destination of the terminal apparatus 10 is not sufficient for the volume of print data (No in step S25), the processor 22 of the terminal apparatus 10 prompts the user in step S26 to move to a location where the reception strength of the radio wave from the access point 14A serving as the connection destination is higher. Then, the process proceeds to step S27. Since the content of step S26 is identical to the content of step S14 described above, a detailed description will be omitted.

If the user moves to a location where the reception strength of the radio wave from the access point 14A serving as the connection destination is higher, the reception strength of the radio wave from the access point 14A serving as the connection destination of the terminal apparatus 10 may possibly become sufficient for the volume of print data. In that case, the possibility of succeeding in printing may increase, as compared with a case where the user does not move.

The processor 22 of the terminal apparatus 10 may prompt the user to move to a location where the reception strength of the radio wave from the access point 14A serving as the connection destination is higher than or equal to a threshold value.

If the reception strength of the radio wave from the access point 14A serving as the connection destination of the terminal apparatus 10 is sufficient for the volume of print data (Yes in step S25), the process proceeds to step S27.

When the access point serving as the connection destination is switched to the access point 14A and the user uses the terminal apparatus 10 to make a request for executing printing, the processor 22 of the terminal apparatus 10 transmits the print data containing the image or document to be printed and printing conditions to the device 12A via the access point 14A. When the device 12A receives the print data via the access point 14A, the device 12A prints the image or document onto a recording medium, such as a sheet, in accordance with the printing conditions in step S27.

Subsequently, in step S28, the processor 22 of the terminal apparatus 10 causes the memory 20 of the terminal apparatus 10 to store the registration information about the device 12A. The content of step S28 includes the content of step S16 described above. In the second exemplary embodiment, information indicating the volume of data of the printed image or document, information indicating the radio field strength of the access point 14A at the time when the printing is performed, and information indicating whether or not the printing is successful are stored in association with one another as information indicating the history of printing in the memory 20 of the terminal apparatus 10 or in another apparatus. The information indicating the history may be contained in the registration information. In a case where the printed image or document contained in the print data is entirely printed properly, information indicating that the printing is successful is contained in the information indicating the history of printing. If the printed image or document is entirely or partially not printed properly, information indicating that the printing has failed is contained in the information indicating the history of printing.

The following description with reference to FIG. 7 relates to the history of printing executed in the past. FIG. 7 illustrates a list indicating the history.

In the list shown in FIG. 7, for each process (e.g., each printing process) performed in a device, identification information for identifying the terminal apparatus 10 (e.g., the name of the terminal apparatus 10) that has made the request for printing, device identification information for identifying the device 12 serving as a printer (e.g., the name of the device 12), AP identification information (e.g., SSID) for identifying the access point 14 connected at the time when the printing is performed, information indicating the reception strength of the radio wave from the access point 14 in the terminal apparatus 10 at the time when the printing is performed, and information indicating whether or not the printing is successful are associated with one another.

For example, the processor 22 of the terminal apparatus 10 classifies the reception strength of the radio wave from the access point 14 into any one of "weak", "medium", and "strong" levels, and registers the classified level in the history list. The range of the reception strength corresponding to each level is set in advance. The processor 22 of the terminal apparatus 10 identifies the level corresponding to the reception strength range including the reception strength of the radio wave from the access point 14, classifies the reception strength of the radio wave from the access point 14 into the identified level, and registers the level in the history list.

For example, in a case where the volume of print data is 10 kB, printing is successful even if the reception strength of the radio wave is at the "weak" level. On the other hand, in a case where the volume of print data is 50 kB, printing has failed if the reception strength of the radio wave is at the "weak" level. Accordingly, even when the reception strength of the radio wave is at the same level, printing may succeed or fail depending on the volume of print data. Based on this history, a threshold value for the volume of print data when the reception strength of the radio wave is at the "weak" level is set. For example, as a threshold value for the volume of print data when the reception strength of the radio wave is at the "weak" level, a maximum volume (e.g., 10 kB) at which successful printing is achieved is set. In the actual printing process, if the reception strength of the radio wave from the access point 14 serving as the connection destination in the terminal apparatus 10 is at the "weak" level and the volume of print data is smaller than or equal to the threshold value (e.g., 10 kB or smaller), the processor 22 of the terminal apparatus 10 determines in step S25 described above that the reception strength of the radio wave from the access point 14 is sufficient for the volume of print data. In contrast, if the reception strength of the radio wave from the access point 14 serving as the connection destination in the terminal apparatus 10 is at the "weak" level and the volume of print data exceeds the threshold value, the processor 22 of the terminal apparatus 10 determines that the reception strength of the radio wave from the access point 14 is not sufficient for the volume of print data.

The same applies to other reception strengths. For example, as a threshold value for the volume of print data when the reception strength of the radio wave is at the "medium" level, 300 kB is set. In the actual printing process, if the reception strength of the radio wave from the access point 14 serving as the connection destination in the terminal apparatus 10 is at the "medium" level and the volume of print data is smaller than or equal to the threshold value (e.g., 300 kB or smaller), the processor 22 of the terminal apparatus 10 determines in step S25 described above that the reception strength of the radio wave from the access point 14 is sufficient for the volume of print data. In contrast, if the reception strength of the radio wave from the access point 14 serving as the connection destination in the terminal apparatus 10 is at the "medium" level and the volume of print data exceeds the threshold value, the processor 22 of the terminal apparatus 10 determines that the reception strength of the radio wave from the access point 14 is not sufficient for the volume of print data.

Furthermore, as a threshold value for the volume of print data when the reception strength of the radio wave is at the "strong" level, 3 MB is set. In the actual printing process, if the reception strength of the radio wave from the access point 14 serving as the connection destination in the terminal apparatus 10 is at the "strong" level and the volume of print data is smaller than or equal to the threshold value (e.g., 3 MB or smaller), the processor 22 of the terminal apparatus 10 determines in step S25 described above that the reception strength of the radio wave from the access point 14 is sufficient for the volume of print data. In contrast, if the reception strength of the radio wave from the access point 14 serving as the connection destination in the terminal apparatus 10 is at the "strong" level and the volume of print data exceeds the threshold value, the processor 22 of the terminal apparatus 10 determines that the reception strength of the radio wave from the access point 14 is not sufficient for the volume of print data.

Even when the conditions including the reception strength of the radio wave and the volume of print data are the same, printing may succeed or fail depending on the device 12. In this case, a threshold value for the volume of print data with respect to each level of reception strength of the radio wave may be set for each device 12.

The reception strength levels are merely examples, and may include finer levels or include two levels. The aforementioned threshold values for the volume are merely examples, and may include other threshold values or may be changed by a user or a manager.

The history information shown in FIG. 7 may be stored in the memory 20 of the terminal apparatus 10 (i.e., a terminal apparatus A in the example shown in FIG. 7), may be stored in the memory 28 of each device 12, or may be stored in another apparatus, such as a server.

Furthermore, the history list may be created for each terminal apparatus 10 or each user and be stored in the memory 20 of each terminal apparatus 10, or the history list may be compiled for multiple terminal apparatuses 10 or multiple users and be stored in the device 12 or another apparatus.

In the case where the history information is stored in the device 12, there is a possibility that the history list is not updated when printing fails. In order to cope with this, the processor 22 of the terminal apparatus 10 acquires the history information from the device 12 when connected to the device 12, updates the history information in accordance with whether the printing has succeeded or failed, and transmits the updated history information to the device 12. Accordingly, the history information stored in the device 12 is updated.

Distance information indicating the distance between the terminal apparatus 10 and the access point 14, distance information indicating the distance between the terminal apparatus 10 and the device 12, and information indicating the communication speed (e.g., fast, normal, or slow) of the access point 14 may be registered in the list shown in FIG. 7.

In the first and second exemplary embodiments described above, when the processor 22 of the terminal apparatus 10 requests the device 12 to execute a process via the access point 14 serving as the connection destination, the processor 22 may guide the user to a location where the connection with the access point 14 is possible at least until the process is completed.

For example, in a case where the processor 22 of the terminal apparatus 10 transmits print data to the device 12A (e.g., a printer) via the access point 14A and requests the device 12A to execute printing, the processor 22 guides the user to a location where the connection with the access point 14A is possible at least until the printing according to the print data is completed. For example, similar to step S14 and step S26 described above, the processor 22 of the terminal apparatus 10 prompts the user to move to a location where the reception strength of the radio wave from the access point 14A in the terminal apparatus 10 is higher until the printing according to the print data is completed. Similar to step S14 and step S26 described above, the processor 22 of the terminal apparatus 10 causes the display of the terminal apparatus 10 to display information indicating the moving direction and distance for the user, as well as an image or map information. The processor 22 of the terminal apparatus 10 may prompt the user to move until the printing application software is terminated or until a predetermined time period elapses from when the printing by the device 12A is completed.

In the first and second exemplary embodiments described above, in a case where the processor 22 of the terminal apparatus 10 connects to the access point 14 and requests the device 12 to execute a process, the processor 22 may prompt the user to limit the movement of the user who has requested the device 12 to execute the process.

For example, in a case where the processor 22 of the terminal apparatus 10 transmits print data to the device 12A (e.g., a printer) via the access point 14A and requests the device 12A to execute printing, the processor 22 prompts the user to limit the movement of the user who has made the request for executing printing. In detail, the processor 22 of the terminal apparatus 10 causes the display of the terminal apparatus 10 to display a message, such as "please do not move from that location" or "please do not move from front of device 12A". It is assumed that the fact that the device 12A is requested to execute printing via the access point 14A implies that the terminal apparatus 10 is properly connected to the access point 14A at the current location of the user carrying the terminal apparatus 10. When the user moves while carrying the terminal apparatus 10, there is a possibility that the reception strength of a signal from the access point 14A in the terminal apparatus 10 may weaken or the terminal apparatus 10 may become incapable of receiving a signal from the access point 14A. In order to prevent this, the processor 22 of the terminal apparatus 10 prompts the user to limit the movement.

The processor 22 of the terminal apparatus 10 may prompt the user to limit the movement until the process (e.g., printing) is completed.

The processor 22 of the terminal apparatus 10 may prompt the user to limit the movement if the reception strength of the signal from the access point 14A in the terminal apparatus 10 is higher than or equal to a threshold value at the current location of the user, and may prompt the user to move if the reception strength is lower than the threshold value, similar to step S14 and step S26.

The functions of the terminal apparatus 10, the device 12, and the access point 14 described above are realized by, for example, hardware and software operating in cooperation with each other. For example, the processor of each apparatus reads and executes a program stored in the memory of each apparatus to realize the function of each apparatus. The program is stored in the memory via a storage medium, such as a CD or a DVD, or via a communication path, such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor configured to:
   cause a memory to store information related to a first access point when connecting to a device that is to execute a process via the first access point and cause the device to execute the process;
   when requesting the device to execute the process, and a currently-connected access point is different from the first access point, execute a switching process for switching the currently-connected access point to the first access point;
   in a case where the information processing apparatus is set to automatically switch an access point serving as a connection destination in accordance with a reception strength of a radio wave from another access point, connect to the first access point, without connecting to a second access point, until the process is completed, even when a reception strength of a radio wave from the second access point is higher than a reception strength of a radio wave from the first access point;
   prompt a user to move to a location where a reception strength of a radio wave from the first access point is higher;
   transmit data to the device when requesting the device to execute the process; and
   prompt or not prompt the user to move in accordance with a relationship between a volume of the data and the reception strength of the radio wave from the first access point.

2. The information processing apparatus according to claim 1,
   wherein the switching process includes switching the access point serving as the connection destination to the first access point even when a switching command is not received from the user, or prompting the user to switch the access point serving as the connection destination to the first access point.

3. The information processing apparatus according to claim 1,
   wherein the processor is further configured to guide the user to a location where a connection with the first access point is possible at least until the process is completed when requesting the device to execute the process.

4. The information processing apparatus according to claim 2,
   wherein the processor is further configured to guide the user to a location where a connection with the first access point is possible at least until the process is completed when requesting the device to execute the process.

5. The information processing apparatus according to claim 1,
   wherein the processor is further configured to prompt a user to limit movement of the user when requesting the device to execute the process by connecting to the first access point.

6. The information processing apparatus according to claim 2,
   wherein the processor is further configured to prompt the user to limit movement of the user when requesting the device to execute the process by connecting to the first access point.

7. The information processing apparatus according to claim 1,
   wherein the device includes a printer,
   wherein the process includes printing of print data, and
   wherein the processor is configured to transmit the print data to the printer when requesting the printer to execute printing.

8. A non-transitory computer readable medium storing a program causing a computer to execute a process, the process comprising:
   causing a memory to store information related to a first access point when connecting to a device that is to execute a process via the first access point and causing the device to execute the process;
   when requesting the device to execute the process, and a currently-connected access point is different from the first access point, executing a switching process for switching the currently-connected access point to the first access point;
   in a case where an access point serving as a connection destination is set to be automatically switched in accordance with a reception strength of a radio wave from another access point, connecting to the first access point, without connecting to a second access point, until the process is completed, even when a reception strength of a radio wave from the second access point is higher than a reception strength of a radio wave from the first access point;

prompting a user to move to a location where a reception strength of a radio wave from the first access point is higher;

transmitting data to the device when requesting the device to execute the process; and prompting or not prompting the user to move in accordance with a relationship between a volume of the data and the reception strength of the radio wave from the first access point.

9. An information processing method comprising:

causing a memory to store information related to a first access point when connecting to a device that is to execute a process via the first access point and causing the device to execute the process;

when requesting the device to execute the process, and a currently-connected access point is different from the first access point, executing a switching process for switching the currently-connected access point to the first access point;

in a case where an access point serving as a connection destination is set to be automatically switched in accordance with a reception strength of a radio wave from another access point, connecting to the first access point, without connecting to a second access point, until the process is completed, even when a reception strength of a radio wave from the second access point is higher than a reception strength of a radio wave from the first access point;

prompting a user to move to a location where a reception strength of a radio wave from the first access point is higher;

transmitting data to the device when requesting the device to execute the process; and prompting or not prompting the user to move in accordance with a relationship between a volume of the data and the reception strength of the radio wave from the first access point.

* * * * *